US008986216B2

(12) United States Patent
Unger

(10) Patent No.: US 8,986,216 B2
(45) Date of Patent: Mar. 24, 2015

(54) PROCESS FOR LEAK TESTING, DEVICE AND RESPIRATOR

(75) Inventor: Jürgen Unger, Berlin (DE)

(73) Assignee: Dräger Saftey AG & Co. KGaA, Lübeck (DE)

( * ) Notice: Subject to any disclaimer, the term of this patent is extended or adjusted under 35 U.S.C. 154(b) by 720 days.

(21) Appl. No.: 13/101,421

(22) Filed: May 5, 2011

(65) Prior Publication Data

US 2012/0022390 A1   Jan. 26, 2012

(30) Foreign Application Priority Data

Jul. 22, 2010   (DE) .......................... 10 2010 031 961

(51) Int. Cl.
*A61B 5/08*   (2006.01)
*A62B 27/00*   (2006.01)

(52) U.S. Cl.
CPC .................................. *A62B 27/00* (2013.01)
USPC ......................................... 600/538; 600/529

(58) Field of Classification Search
CPC .. A61B 5/0205; A61B 5/4848; A61B 5/4836; A61B 5/7282
USPC .................................. 600/529–543
See application file for complete search history.

(56) References Cited

U.S. PATENT DOCUMENTS

| 5,072,728 A | 12/1991 | Pasternack |
| 6,131,571 A * | 10/2000 | Lampotang et al. ..... 128/204.21 |
| 2002/0082867 A1* | 6/2002 | MacCarter et al. .............. 705/2 |
| 2005/0188991 A1* | 9/2005 | Sun et al. ................. 128/204.23 |
| 2008/0119753 A1* | 5/2008 | Ricciardelli et al. .......... 600/532 |
| 2008/0295837 A1* | 12/2008 | McCormick et al. ..... 128/204.21 |
| 2012/0065533 A1* | 3/2012 | Carrillo et al. ................ 600/532 |

FOREIGN PATENT DOCUMENTS

| CN | 2543036 Y | 4/2003 |
| DE | 3930362 C2 | 3/1991 |

* cited by examiner

*Primary Examiner* — Michael Kahelin
*Assistant Examiner* — Karen Toth
(74) *Attorney, Agent, or Firm* — McGlew and Tuttle, P.C.

(57) ABSTRACT

A process is provided for leak testing in a respirator (10) with overpressure operation. An indicator of a breathing gas consumption is compared with an indicator of an expiration volume and a leak is detected in case of a deviation of the result of the comparison (58) from a desired value. A device is also provided for carrying out the process as well as to a respirator (10) with overpressure operation with such a device.

15 Claims, 3 Drawing Sheets

| Oxygen consumption in L | Slope of the oxygen characteristic | Total expiration volume characteristic | Slope of the expiration volume characteristic | Respiration rate | Quotient | Leak present? [1: yes; 0: no] |
|---|---|---|---|---|---|---|
| 68,14 | 0,002341 | 14,87 | 0,01554 | 36 | 6,64 | 0 |
| 68,16 | 0,002447 | 14,87 | 0,01554 | 36 | 6,35 | 0 |
| 68,17 | 0,002625 | 14,87 | 0,015531 | 36 | 5,92 | 1 |
| 68,19 | 0,002731 | 14,87 | 0,015531 | 36 | 5,69 | 1 |
| 68,22 | 0,002802 | 14,87 | 0,015527 | 36 | 5,54 | 1 |

PROCESS FOR LEAK TESTING, DEVICE AND RESPIRATOR

CROSS REFERENCE TO RELATED APPLICATIONS

This application claims the benefit of priority under 35 U.S.C. §119 of German Patent Application DE 10 2010 031 961.9 filed Jul. 22, 2010, the entire contents of which are incorporated herein by reference.

FIELD OF THE INVENTION

The present invention pertains to a process for leak testing in a respirator, especially in a respirator operating with overpressure. The present invention pertains, furthermore, to a device for carrying out the process as well as to a respirator with such a device.

BACKGROUND OF THE INVENTION

Respirators operating independently from the ambient atmosphere, so-called freely portable isolating devices, are generally known. They offer protection, among other things, against lack of oxygen and against toxic substances, especially toxic gases, from the ambient atmosphere. Defined breathing gases are fed to the user by means of the respirator. The breathing gases may consist of air or oxygen, possibly as a mixture with other suitable gases such as nitrogen.

In case of freely portable isolating devices, distinction can be made between container type devices, e.g., with compressed air (compressed air devices, also called compressed air breathing apparatuses), and regeneration type devices. In container type devices with compressed air, the latter is carried along as a reserve, for example, in pressurized cylinders, and carbon dioxide-containing expired air is removed into the ambient atmosphere. Thus, the duration of use per mission is limited in case of container type devices; in addition, it depends, among other things, on the user's build and the particular use and is usually in a range of 20 minutes to 60 minutes. In case of a regeneration type device, the user is supplied with oxygen from an oxygen reserve carried along in the device. For example, compressed oxygen, compressed oxygen-nitrogen mixtures or chemically bound oxygen are considered for use as an oxygen reserve. However, contrary to the container type device, the expired gas is not released into ambient atmosphere through an expiration valve, but is at least partly regenerated in the device. The carbon dioxide ($CO_2$) contained in the expired gas is removed at least partly. The expired gas is usually sent for this via or through a regenerating material, which is normally present in a regenerating cartridge, through which the breathing gas flows, is bound by same, and is thus removed from the expired gas. The oxygen consumed by the user is complemented from the reserve as needed and the regenerated breathing gas, which is optionally enriched with oxygen, is again fed to the user. This "circuit" leads to a considerably prolonged duration of use per mission. Such respirators are also called closed-circuit respirators.

A slight vacuum is generated in the mask space of the breathing mask of the respirator during inspiration by the user in prior-art freely portable isolating devices with normal pressure. If a leak develops in the device in the vacuum range, i.e., a lack of tightness of the breathing mask due to the breathing mask slipping on the user's face, toxic substances, such as toxic particles or undesired gases, could penetrate from the ambient atmosphere into the breathing gas circulation in the device, and these are then possibly inhaled by the user.

To prevent or reduce the penetration of toxic substances, devices with overpressure are preferred, in which a slight overpressure of the breathing gas constantly prevails in the mask space. Since there is consequently a pressure gradient from the mask space to the ambient atmosphere all the time, only breathing gas can flow off to the outside in case of a possible leak, but no gas can enter the breathing gas circulation from the ambient atmosphere. However, it is disadvantageous here that the breathing gas reserve is consumed rapidly due to the uncontrolled discharge and the duration of use of the respirator is thus undesirably shortened. It is of great significance that the user be informed of the leak especially if an unnoticed slip of the mask occurs, e.g., because of major stresses on the part of the user or when working in tight surroundings.

There is a permanent pressure measurement and display (pressure gauge) in generally known devices, as a result of which the user is continuously informed of the breathing gas reserve available to him. A warning means indicates when the breathing gas reserve comes to an end. However, this type of measurement of the state provides no information on whether a high oxygen consumption has developed because of increased respiratory activity or a leak.

DE 3930362 C2 describes the switching off of the overpressure in a closed-circuit respirator with overpressure operation in case of an excessively high oxygen consumption. The oxygen consumption is determined in the device being described by measuring the flow of oxygen from a compressed gas cylinder carried along by means of a flow measuring means directly behind the pressure reducer connected to the compressed gas cylinder. To determine whether the excessively high oxygen consumption from the compressed gas cylinder carried along has developed because of a leak or because of a higher oxygen consumption by the user, the oxygen consumption is determined on the basis of the flow of oxygen during the expiration phase of the user only. The consumption is compared with a preset limit value and the overpressure is switched off in case the limit value is exceeded. However, this process functions only in devices with demand-controlled respiration by means of demand oxygen systems, e.g., in compressed air breathing apparatuses. By switching off the overpressure, the outflow of the breathing gas from the device because of the leakage is reduced and the service life of the closed-circuit respirator is thus prolonged. However, undesired gases may enter the breathing circulation from the ambient atmosphere, e.g., toxic gases, such as CO, because of the lack of overpressure in the closed breathing circuit.

Other prior-art regeneration type devices, e.g., model PSS BG4 (Dräger), usually operate, based on their principle of action, usually with a volume-controlled breathing gas demand. Oxygen is now introduced continuously into the closed breathing circuit via a constant dispensing. If the breathing gas consumption is increased as a consequence of a higher stress of the user or because of a leak, oxygen is additionally dispensed into the breathing gas circulation via a minimum valve. The minimum valve is opened when the gas volume in the breathing gas circulation has dropped below a certain value, e.g., when a breathing bag used for volume compensation is empty. The volume removed from the oxygen cylinder cannot be higher at any time than the volume of oxygen that has been uniformly introduced into the breathing circuit by the constant dispensing during the expiration phase of the user, even in case of an existing leak in the system. This results from the fact that an increased oxygen consumption is possible only by opening the minimum valve, which dispenses a volume flow of more than 80 L/minute into the breathing bag. However, this is opened only when the breathing bag is empty. However, the breathing bag is filled with the expired gas volume during the expiration phase of the user, assuming that the components in the expiration branch of the device do not have a major leak, e.g., an expiration tube that is not connected.

SUMMARY OF THE INVENTION

The basic object of the present invention is therefore to provide an improved process for leak testing in a respirator with overpressure operation. In addition, a device suitable for carrying out the process as well as a respirator with improved leak testing shall be described.

Concerning the process, this object is accomplished according to the present invention. The breathing gas consumption is especially oxygen consumption. In the process for leak testing in a respirator with overpressure operation, an indicator of the oxygen consumption is compared with an indicator of an expiration volume by means of mathematical and/or logic methods and a deviation of the result of the comparison from a preset or presettable desired value is detected as a leak. A loss of breathing gas, which cannot be attributed to breathing, has consequently developed probably due to a leak and can thus be detected simply and efficiently. For example, a volume of breathing gas consumed, especially from a breathing gas reserve, can be compared with an expiration volume of the user. "Volume consumed from a breathing gas reserve" is defined here especially as a volume made available to the user for breathing. The breathing gas volume consumed is at a certain ratio to the volume of breathing gas expired by the user in a respirator without or with a negligible leak. A deviation from this ratio, which is, e.g., outside a preset standard deviation or above or below a threshold value, means that a loss of air takes place from the respirator. A leak is therefore detected.

The present invention is based on the discovery that a breathing gas consumption is correlated with an expiration volume and the breathing gas consumption also increases during intensified breathing. However, if the breathing gas consumption increases independently from an intensified breathing, this "loss of breathing gas" can be most probably attributed to a leak in the system, i.e., for example, suboptimal fitting of the breathing mask.

This discovery is implemented such that ratios of the volume of breathing gas consumed to the expiration volume, or corresponding indicators of these volumes, are compared with one another for detecting leaks, and a leak is detected in case of a deviation from the "normal" or desired value.

This object is accomplished according to the present invention by the device for carrying out the process described above and below and by the features of the respirator.

The device for carrying out the process, which is embodied, e.g., in the form of a measuring and testing device, comprises here a first determination device for the direct or indirect determination of a first indicator of a breathing gas consumption. Furthermore, a second determination device for the direct or indirect determination of a second indicator of an expiration volume and a comparator are provided. The first and second indicators can be sent as input signals to the comparator. The comparator is provided and designed to determine a deviation of the indicators. This may be done by a mathematical or logic linking of the input signals. The deviation is compared with a desired value. A leak is detected if the deviation and the desired value do not fit together, i.e., if the deviation does not essentially correspond to the desired value.

A respirator with overpressure operation, which comprises a device for leak detection as described above and below, is especially reliable because the leak is detected reliably and if a corresponding signal is generated by an additional possible signal device, a user can be possibly alerted to the leak.

A correlation factor of the indicator of the breathing gas consumption and the indicator of the expiration volume is determined in one embodiment of the process. A leak state is detected in case of a deviation of the correlation factor from the desired value or a desired value. The desired value may be the desired value for the deviation of the indicators of breathing gas consumption and expiration volume from each other and another, suitable desired value, for example, a correlation factor desired value or the like.

In one embodiment, the leak is detected when the deviation from the desired value exceeds or drops below a preset or presettable threshold value. For example, slight deviations can thus be filtered by means of the threshold value or a sensitivity of the leak detection can be set.

In a preferred embodiment, a breathing gas consumption characteristic or a slope of a breathing gas consumption characteristic is the indicator of the breathing gas consumption and an expiration volume characteristic or a slope of the expiration volume characteristic is the indicator of the expiration volume.

A first correlation factor of the breathing gas consumption characteristic and expiration volume characteristic is determined as a desired value in an especially preferred embodiment. This is compared with a second correlation factor of the breathing gas consumption characteristic and expiration volume characteristic. Each user has an individual basic oxygen consumption, and if the desired value is determined on the basis of this basic consumption, especially good recognition of unusual "breathing gas loss," which is due to a leak, is possible. It is also possible to determine and compare with one another more than two correlation factors, which leads to a reduced susceptibility to error.

In particular, the first correlation factor indicates a ratio of a slope of the breathing gas consumption characteristic and a slope of the expiration volume characteristic relative to a first time period or a first point in time and the second correlation factor indicates the ratio of the slope of the breathing gas consumption characteristic and the slope of the expiration volume characteristic relative to a second time period or a second point in time. The use of the correlation factors of the slopes of the characteristics makes possible an especially simple detection of leaks. In particular, the first and second correlation factors, e.g., $X1$ and $X2$, relative to a first time period from the beginning of the use of the respirator $t0$ to a point in time $t1$ (for $X1$) and a second time period from $t0$ to a point in time that is later than $t1$, i.e., $t2$ (for $X2$), are determined.

The leak is detected in a preferred embodiment if the second correlation factor is lower than the first correlation factor.

A signal is preferably generated when the leak is detected. This is advantageous because a user is alerted to the leak and the user can thus take appropriate countermeasures or possibly start retreating from a dangerous situation.

In one embodiment, the indicator of the expiration volume is compared with an indicator of a desired value of stress and a stress signal is generated in case of a deviation, especially in case of a deviation exceeding or dropping below a preset, suitable threshold value. The indicator of the expiration volume may also be the respiration rate of the user, which can be determined by means of the flow sensor, and the desired value of stress may correspond to a value of the respiration rate at rest or to an average of the respiration rate. Since the values underlying the indicator of the expiration volume are affected by increased stressing of the user due to stress, physical activity or the like (for example, the respiration rate is increased when the user must perform heavy physical work), the user's stress can be determined simply and efficiently.

Consequently, ratios of the breathing gas consumption volume and expiration volume are used in the process according to the present invention to detect leaks, or corresponding indicators of these volumes, for example, a slope of the breathing gas consumption volume characteristic and a slope of an expiration volume characteristic for two time periods are used. If slopes of characteristics are used, the corresponding characteristics are at first to be determined mathematically or logically, the slopes of the characteristics are then determined for these, likewise mathematically or logically, and the slopes of the characteristics are then compared with one another. A deviation of the ratios of the slopes of the characteristics from a desired value is a strong indicator of a leak.

To determine the characteristics, a breathing gas consumption volume can be determined from a breathing gas reserve, and an expiration volume is added up with each expiration by the user since the beginning of the measurement. The change in the two volumes (breathing gas consumption volume from the reserve and added-up total expiration volume) is determined as a function of the time. The corresponding characteristics are obtained from the determined values of the breathing gas consumption volume and the total expiration volume. The slope of the respective characteristic is related to a section of the corresponding characteristic between two points, which indicate the current value of the corresponding volume and of a value that was earlier in time, especially of a value present n seconds ago, n being the time period in seconds that is to be checked for the presence of a leak. There is a certain ratio between the slopes of the two characteristics during constant respiration by the user, which is characterized mathematically by a (correlation) factor X.

Values of X can be determined as follows:

$$X = \text{slope of the characteristic of the total expiration volume/slope of the characteristic of the total breathing gas consumption.}$$

This value X is monitored temporarily or continuously, i.e., values of X are determined at different points in time or over different time periods, which may also overlap, and are compared to one another. If the user consumes more breathing gas, for example, because of physical stress and hence also a higher tidal volume, both the slope of the characteristic of the total expiration volume and the slope of the characteristic of the total breathing gas consumption from the pressurized cylinder increase. The value X consequently remains approximately constant.

If the breathing gas consumption increases despite constant breathing (or constant expiration volume) of the user of the device, the value of X changes, which is an indication of a leak. The user can now be warned, for example, optically and/or acoustically and the user is thus able to take appropriate countermeasures, e.g., to check the fitting of the mask or to start retreating from the dangerous area.

Especially a reduction of the value X compared with a value that was obtained earlier in time is thus an indicator of a leak in the breathing circuit.

In one embodiment of the device for carrying out the process described above and to be described below, the first determination device comprises a pressure sensor, especially a high-pressure sensor, for determining a pressure of a breathing gas reserve, especially of an oxygen reserve, and/or the second determination device comprises a flow sensor for expired gas, which is arranged especially in an expiration branch of the respirator. The high-pressure sensor is preferably arranged in the flow path of the breathing gas behind a breathing gas reservoir, e.g., a compressed oxygen cylinder. This sensor measures, directly or indirectly, the pressure in the breathing gas reservoir. Based on a sent signal, a breathing gas volume consumed during a certain time period is determined, for example, by taking into account the original or maximum filling pressure of the breathing gas reservoir and the volume of the breathing gas reservoir. The flow sensor measures a volume flow during expirations by the user, on the basis of which the expiration volume can be determined.

The respirator comprises, in particular, an analyzing device for determining a deviation of the indicator of the expiration volume from the indicator of the desired value of stress and a means for generating a stress signal when the deviation is determined, especially when the desired value of stress is exceeded by or drops below a suitable threshold value.

An exemplary embodiment of the present invention will be explained in more detail below on the basis of the drawings. Objects or elements that correspond to each other are designated by the same reference numbers in all figures.

The exemplary embodiment or each exemplary embodiment shall be considered not to represent a limitation of the present invention. Numerous variations and modifications are rather possible within the framework of the present disclosure, in particular, such variants and combinations which the person skilled in the art can identify, for example, by a combination or modification of individual features or elements or process steps described in the general or special part of the specification as well as contained in the claims and/or in the drawings with respect to accomplishing the object and which lead to a novel subject or to novel process steps or sequences of process steps due to features that that can be combined.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
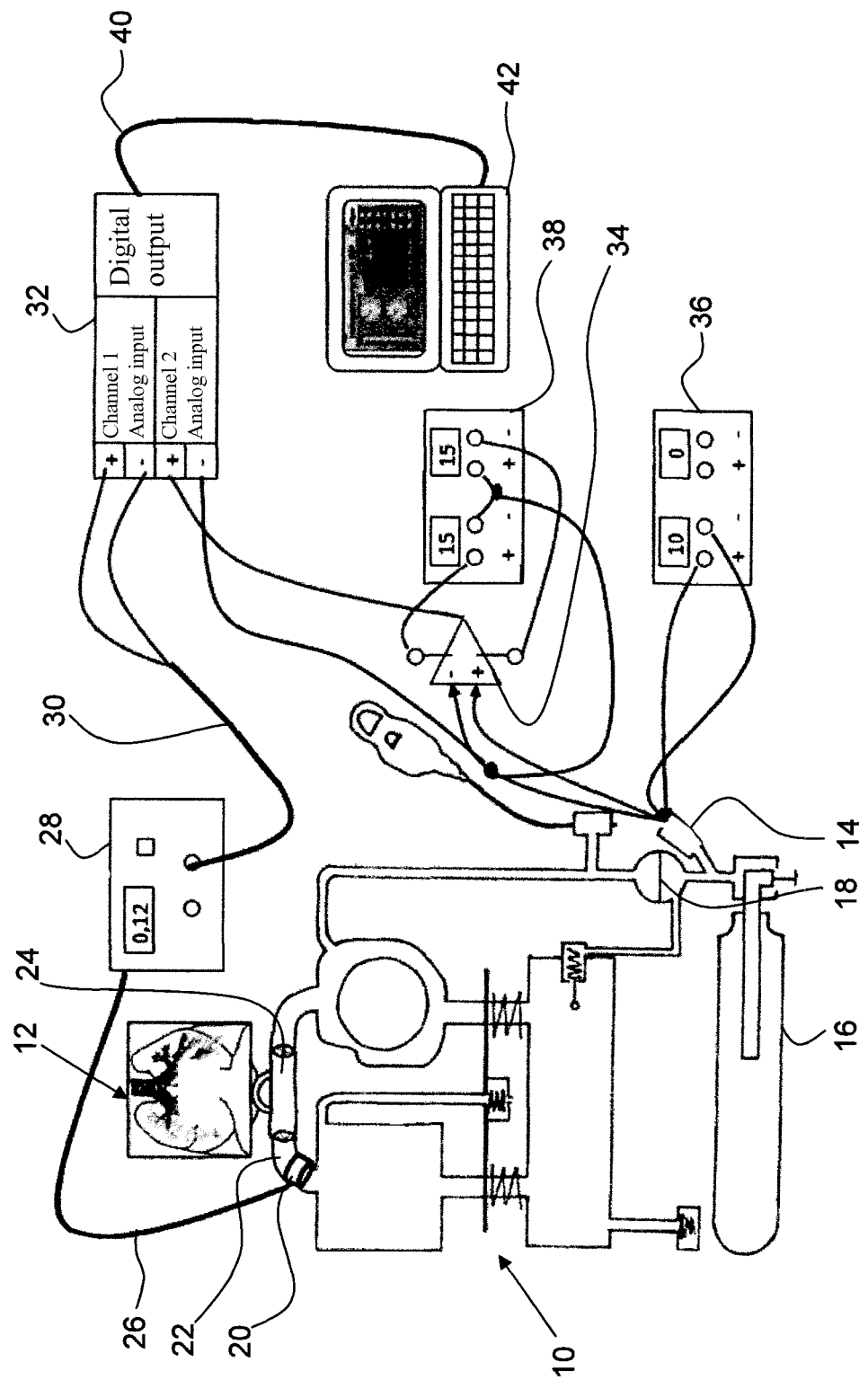
FIG. 1 is a schematic view of a respirator according to an embodiment of the present invention.

Referring to the drawings in particular, FIG. 1 shows a schematic view of a respirator 10 according to an embodiment of the present invention, which is connected to a user 12, represented by schematically shown lungs here. A high pressure sensor 14 is arranged between a breathing gas reservoir, here a compressed oxygen cylinder 16, and a reducing valve 18. A flow sensor 20 for the expired gas, by means of which an indicator of an expiration volume can be determined, is arranged in an expiration branch 22 of a closed breathing circuit 24 of the respirator 10. The flow sensor 20 is communicatively connected by means of an electric connection cable 26 to a flow sensor data acquisition device 28, which is in turn connected communicatively to a data acquisition module 32 by means of a signal transmission line 30. The high pressure sensor 14 is likewise connected communicatively to the data acquisition module 32. In addition, it is communicatively connected to an operational amplifier 34, which is in turn connected to the data acquisition module 32. The high pressure sensor 14 and operational amplifier 34 are supplied with electricity by a respective voltage supply unit 36, 38. Signal conversion from incoming analog signals into digital signals is carried out in the data acquisition module 32. A digital output signal is sent for processing by means of a signal line 40 to a data processing device, here a microcontroller 42.

Figure 2:
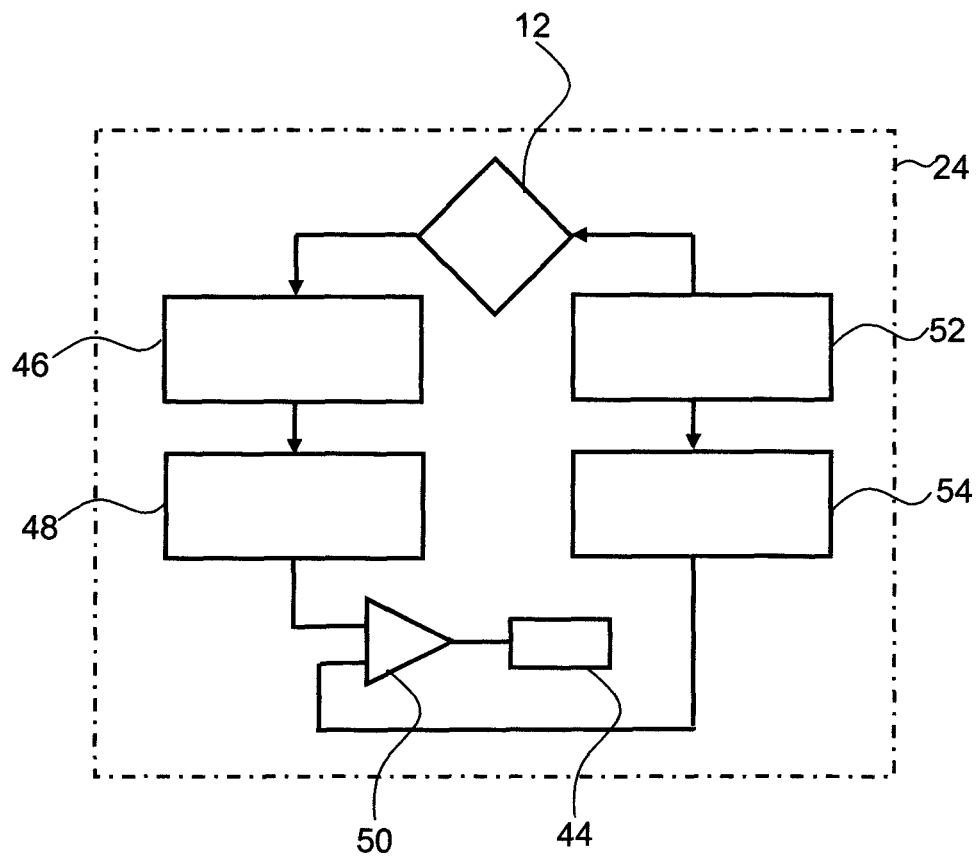
FIG. 2 is a schematic view of the course of a process for determining a correlation factor.

FIG. 2 shows a schematic view of the course of a process for determining a correlation factor 44 (first correlation factor) in a closed breathing circuit 24 of a respirator 10 (as is shown, for example, in FIG. 1) without leak, in which a total expiration volume since the beginning of respiration by a user 12 with the respirator 10 is detected in a first process step 46. A first slope of a characteristic of the total expiration volume between two measurement points, which are spaced n seconds apart in time, is determined in a second process step 48 and sent as an input signal to a comparator 50. Comparator 50 may be designed, e.g., as a functionality or as part of the microcontroller 42, as is shown in FIG. 1. A total oxygen consumption is detected in a third process step 52 from a breathing gas reserve since the beginning of respiration by the user 12, and a second slope of a characteristic of the total oxygen consumption between two measurement points, which are spaced n seconds apart in time, is determined in a fourth process step 54 and likewise sent to the comparator 50 as an input signal. The input signals are compared and the correlation factor 44 is determined. The first and/or second process step 46, 48 may be performed before or after the third and/or fourth process step 52, 54.

Figure 3:
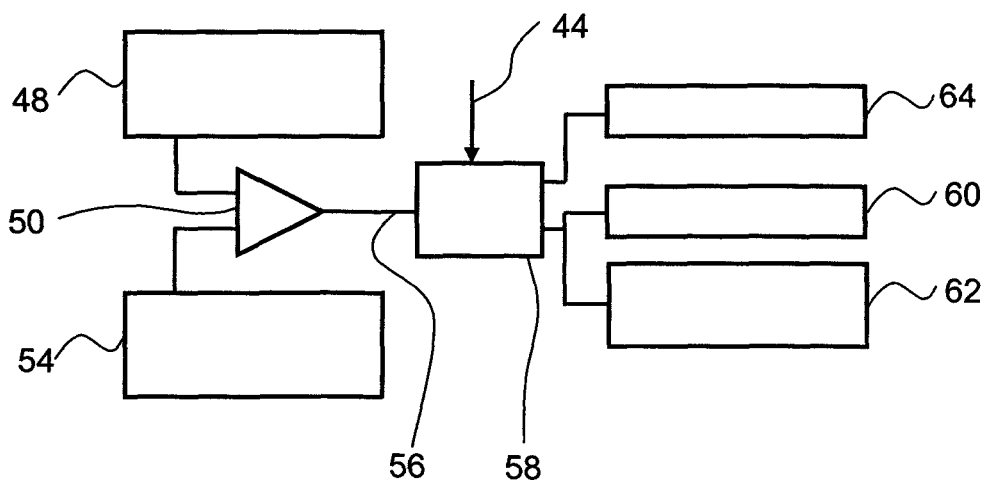
FIG. 3 is a schematic view of the course of a process for determining a deviation of correlation factors according to one embodiment of the present invention.

FIG. 3 shows a schematic view of the course of a process for determining a deviation of correlation factors according to an embodiment of the present invention, in which the correlation factors are determined as shown in FIG. 2. The slopes of the total expiration volume and total oxygen consumption characteristics are determined according to the second and fourth process steps 48, 54 (FIG. 2) and sent as input signals to the comparator 50, which generates as the input signal the correlation factor, here the second correlation factor 56. This is compared, 58, with the first correlation factor 44, which was determined for an earlier time period. If the second correlation factor 56 is lower than the first correlation factor 44, a leak is detected, 60, and a first signal can be generated, 62. If the second correlation factor 56 is not lower than the first one 44, no leak is detected. For example, a second signal, which means "system in order," can be generated in this case, 64.

Figures 4, 5:
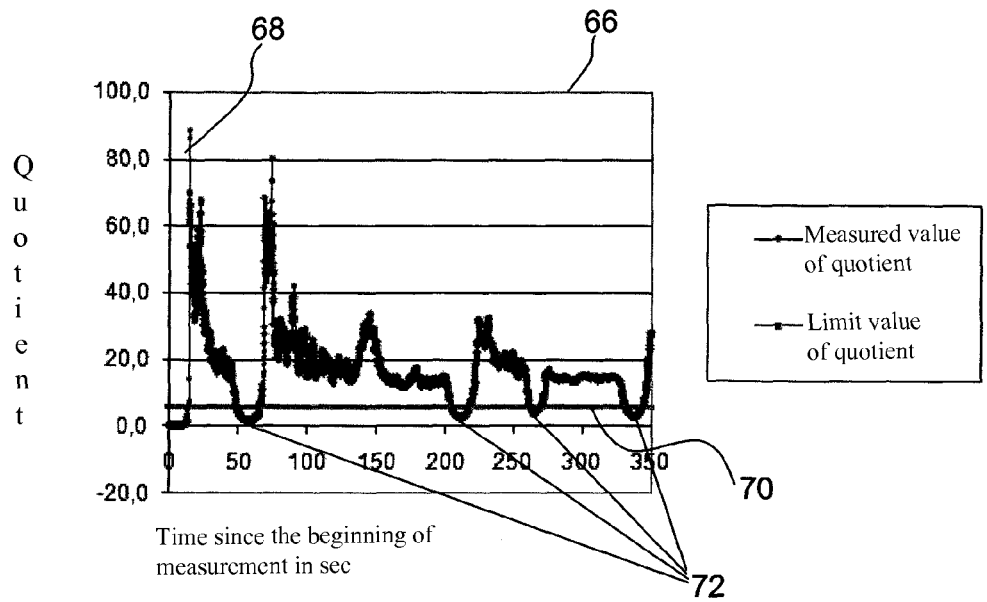
FIG. 4 is a diagram in which a correlation factor quotient is plotted over time.
FIG. 5 is a table of correlation factor quotients according to FIG. 4.

FIG. 4 shows a diagram 66, in which correlation factor quotients 68, which were determined by means of a breathing testing device (artificial lung), are plotted over time. A leak 72 of the respirator 10 (shown in FIG. 1) is detected if the actual value is below a limit value 70. Consequently, an indicator of a breathing gas consumption is compared with an indicator of an expiration volume, and a result of the comparison is the correlation factor quotient 68 here. A leak 72 is determined in case of a deviation of the result of the comparison, i.e., when the correlation factor quotient 68 is below the limit value 70 here.

FIG. 5 shows a table of correlation factor quotients 68 as is shown in FIG. 4. The correlation factor quotients 68 were determined by means of a slope 76 of the total expiration volume characteristic, determined on the basis of a total expiration volume 74 in L, and a slope 80 of the total breathing gas consumption characteristic, determined on the basis of a breathing gas consumption, here oxygen consumption 78 in L. This was carried out mathematically by dividing the slope 76 of the total expiration volume characteristic by the slope 80 of the total breathing gas consumption characteristic. The slope 80 of the total breathing gas consumption characteristic is consequently an indicator of the breathing gas consumption in this example and the slope 76 of the total expiration volume is the indicator of the expiration volume. As an alternative, it is possible to use other suitable indicators as well.

A lack of tightness 82 (or leak) is detected in case of a deviation of the quotients 68, represented by a circle here. A respiration rate 84 is constant.

The present invention can thus be briefly described as follows:

A process is provided for leak testing for a respirator 10 with overpressure operation, wherein an indicator of a breathing gas consumption is compared with an indicator of an expiration volume and a leak is detected in case of a deviation of the result of the comparison 58 from a desired value. A device for carrying out the process is provided as well as a respirator 10 with overpressure operation with such a device are proposed.

While specific embodiments of the invention have been shown and described in detail to illustrate the application of the principles of the invention, it will be understood that the invention may be embodied otherwise without departing from such principles.

LIST OF REFERENCE NUMBERS

10 Respirator
12 User
14 High pressure sensor
16 Compressed oxygen cylinder
18 Reducing valve
20 Flow sensor
22 Expiration branch
24 Closed breathing circuit
26 Electric connection cable
28 Flow sensor data acquisition device
30 Signal transmission line
32 Data acquisition module
34 Operational amplifier
36 Power supply
38 Power supply
40 Signal line
42 Microcontroller
44 Correlation factor
46 First process step
48 Second process step
50 Comparator
52 Third process step
54 Fourth process step
56 Second correlation factor
58 Comparison
60 Detection of a leak
62 Generation of a first signal 64 Generation of a second signal
66 Diagram
68 Correlation factor quotient
70 Limit value
72 Leak
74 Total expiration volume
76 Slope of total expiration volume characteristic
78 Oxygen consumption
80 Slope of total breathing gas consumption characteristic
82 Leak
84 Respiration rate

What is claimed is:

1. A device for leak testing in a freely portable isolating device respirator with a closed breathing circuit with an inspiration branch for inspiration of gas from the breathing circuit and an expiration branch for expiration of gas to the breathing circuit and a breathing gas reservoir connected to the breathing circuit to deliver breathing gas to the circuit to compensate for breathing gas consumed by the user or removed from the breathing circuit, resulting in a breathing gas consumption of breathing gas from the breathing gas reservoir and with overpressure operation, the device comprising:
a first determination device for determining a first indicator of the breathing gas consumption from the breathing gas reservoir;
a second determination device for determining a second indicator of an expiration volume; and
a comparator which receives the indicators as input signals and compares the indicator of the breathing gas consumption with the indicator of the expiration volume to produce a comparison value result, which has a desired value for the comparison of the indicator of the breathing gas consumption with the indicator of the expiration volume and detects a leak in a case of a deviation of the comparison value result from the desired value, wherein the first determination device comprises a value from a high pressure sensor for determining a pressure of an oxygen reserve and/or the second determination device comprises a flow sensor arranged in an expiration branch.

2. A device in accordance with claim 1, wherein the comparator is part of a microcontroller that determines a correlation factor of the indicator of the breathing gas consumption and of the indicator of the expiration volume and the leak is detected in case of a deviation of the correlation factor from the desired value.

3. A device in accordance with claim 2, wherein the leak is detected when the deviation exceeds or drops below a threshold value.

4. A freely portable isolating device respirator with overpressure operation, the respirator comprising:
a closed breathing circuit with an inspiration branch for inspiration of gas from the breathing circuit and an expiration branch for expiration of gas to the breathing circuit;
a breathing gas reservoir connected to the breathing circuit to deliver breathing gas to the circuit to compensate for breathing gas consumed by the user or removed from the breathing circuit, resulting in a breathing gas consumption of breathing gas from the breathing gas reservoir;
a first determination device for determining a first indicator of the breathing gas consumption from the breathing gas reservoir;
a second determination device for determining a second indicator of an expiration volume; and
a comparator which receives the indicators as input signals and compares the indicator of the breathing gas consumption with the indicator of the expiration volume to produce a comparison value result, which has a desired value for the comparison of the indicator of the breathing gas consumption with the indicator of the expiration volume and detects a leak in a case of a deviation of the comparison value result from the desired value, wherein:
the first determination device comprises a value from a high pressure sensor for determining a pressure of an oxygen reserve; and
the second determination device comprises a flow sensor arranged in the expiration branch.

5. A respirator in accordance with claim 4, wherein the comparator is part of a microcontroller that determines a correlation factor of the indicator of the breathing gas consumption and of the indicator of the expiration volume and the leak is detected in case of a deviation of the correlation factor from the desired value.

6. A respirator in accordance with claim 4, wherein the leak is detected when the deviation exceeds or drops below a threshold value.

7. A respirator in accordance with claim 4, wherein:
the indicator of the breathing gas consumption includes a breathing gas consumption characteristic as the indicator of the breathing gas consumption; and
the indicator of the expiration volume includes an expiration volume characteristic as the indicator of the expiration volume.

8. A respirator in accordance with claim 7, wherein a first correlation factor of the breathing gas consumption characteristic and of the expiration volume characteristic is determined as a desired value and this is compared with a second correlation factor of the breathing gas consumption characteristic and the expiration volume characteristic.

9. A respirator in accordance with claim 8, wherein the first correlation factor indicates a ratio of a slope of the breathing gas consumption characteristic to a slope of the expiration volume characteristic relative to a first time period and the second correlation factor indicates the ratio of the slope of the breathing gas consumption characteristic to the slope of the expiration volume characteristic relative to a second time period.

10. A respirator in accordance with claim 9, wherein the leak is detected if the second correlation factor is lower than the first correlation factor.

11. A process for leak testing in a respirator with overpressure operation, the process comprising the steps of:
providing a first determination device for determining an indicator of a breathing gas consumption;
providing a second determination device for determining an indicator of an expiration volume;
providing a comparator, said comparator receiving said indicator of said breathing gas consumption and said indicator of said expiration volume as input;
comparing the indicator of the breathing gas consumption with the indicator of the expiration volume via said comparator to produce a comparison value result;
providing a desired value for the comparison of the indicator of the breathing gas consumption with the indicator of the expiration volume;
detecting a leak in a case of a deviation of the comparison value result from the desired value, wherein:
a correlation factor of the indicator of the breathing gas consumption and of the indicator of the expiration volume is determined and the leak is detected in case of a deviation of the correlation factor from the desired value;

the step of providing the indicator of the breathing gas consumption includes providing a breathing gas consumption characteristic as the indicator of the breathing gas consumption;
the step of providing the indicator of the expiration volume includes providing an expiration volume characteristic as the indicator of the expiration volume
a first correlation factor of the breathing gas consumption characteristic and of the expiration volume characteristic is determined as the desired value and this is compared with a second correlation factor of the breathing gas consumption characteristic and the expiration volume characteristic; and
the first correlation factor indicates a ratio of a slope of the breathing gas consumption characteristic to a slope of the expiration volume characteristic relative to a first time period and the second correlation factor indicates the ratio of the slope of the breathing gas consumption characteristic to the slope of the expiration volume characteristic relative to a second time period.

12. A respirator with overpressure operation, the respirator comprising:
a closed breathing circuit with an inspiration branch and an expiration branch;
a first determination device for determining a first indicator of a breathing gas consumption;
a second determination device for determining a second indicator of an expiration volume; and
a comparator which receives the indicators as input signals and compares the indicator of the breathing gas consumption with the indicator of the expiration volume to produce a comparison value result, which has a desired value for the comparison of the indicator of the breathing gas consumption with the indicator of the expiration volume and detects a leak in a case of a deviation of the comparison value result from the desired value, wherein:
the first determination device comprises a value from a high pressure sensor for determining a pressure of an oxygen reserve;
the second determination device comprises a flow sensor arranged in the expiration branch;
the indicator of the breathing gas consumption includes a breathing gas consumption characteristic as the indicator of the breathing gas consumption;
the indicator of the expiration volume includes an expiration volume characteristic as the indicator of the expiration volume;
a first correlation factor of the breathing gas consumption characteristic and of the expiration volume characteristic is determined as a desired value and this is compared with a second correlation factor of the breathing gas consumption characteristic and the expiration volume characteristic; and
the first correlation factor indicates a ratio of a slope of the breathing gas consumption characteristic to a slope of the expiration volume characteristic relative to a first time period and the second correlation factor indicates the ratio of the slope of the breathing gas consumption characteristic to the slope of the expiration volume characteristic relative to a second time period.

13. A respirator in accordance with claim 12, wherein the leak is detected if the second correlation factor is lower than the first correlation factor.

14. A process in accordance with claim 11, wherein the leak is detected when the deviation exceeds or drops below a threshold value.

15. A process in accordance with claim 11, wherein the leak is detected if the second correlation factor is lower than the first correlation factor.

* * * * *